United States Patent
Golov (10) Patent No.: US 12,510,951 B2
(45) Date of Patent: *Dec. 30, 2025

(54) DATA LINK BETWEEN VOLATILE MEMORY AND NON-VOLATILE MEMORY

(71) Applicant: Lodestar Licensing Group LLC, Evanston, IL (US)

(72) Inventor: Gil Golov, Backnang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,883

(22) Filed: Nov. 11, 2022

(65) Prior Publication Data

US 2023/0076311 A1 Mar. 9, 2023

Related U.S. Application Data

(63) Continuation of application No. 16/179,072, filed on Nov. 2, 2018, now Pat. No. 11,507,175.

(51) Int. Cl.
*G06F 1/32* (2019.01)
*G06F 1/28* (2006.01)
(Continued)

(52) U.S. Cl.
CPC .............. *G06F 1/3287* (2013.01); *G06F 1/28* (2013.01); *G06F 3/0625* (2013.01); *G06F 3/0647* (2013.01); *G06F 3/068* (2013.01)

(58) Field of Classification Search
CPC ........ G06F 1/3287; G06F 1/28; G06F 3/0625; G06F 3/0647; G06F 3/068
See application file for complete search history.

(56) References Cited

U.S. PATENT DOCUMENTS

| 6,108,598 A | 8/2000 | Sumitani |
| 8,601,321 B2 | 12/2013 | Feng |

(Continued)

FOREIGN PATENT DOCUMENTS

| CN | 104216835 | 12/2014 |
| EP | 2437171 | 4/2012 |

OTHER PUBLICATIONS

International Search Report and Written Opinion, Int. App. No. PCT/US2018/052634, mailed Jan. 20, 2019.

(Continued)

*Primary Examiner* — Stefan Stoynov (57) ABSTRACT

A computing system has a first processing device (e.g., CPU, FPGA, or GPU) and memory regions (e.g., in a DRAM device) used by the processing device during normal operation. In one approach, the computing system is configured to: collect data associated with operation of an autonomous vehicle; monitor, by a first processing device, the collected data; and based on the monitoring, determine that an event on the autonomous vehicle has occurred. The computing system is further configured to, in response to determining that the event has occurred, initiate a transfer of data controlled by a second processing device, the transfer including copying data stored in volatile memory of the autonomous vehicle to non-volatile memory of the autonomous vehicle, wherein the second processing device controls copying of the data independently of the first processing device. The computing system is also further configured to, in response to determining that the event has occurred, reduce or terminate power to the first processing device.

17 Claims, 7 Drawing Sheets

(51) Int. Cl.
*G06F 1/3287* (2019.01)
*G06F 3/06* (2006.01)

(56) References Cited

U.S. PATENT DOCUMENTS

| | | | |
|---|---|---|---|
| 9,331,989 B2 | 5/2016 | Dover | |
| 9,533,579 B2 | 1/2017 | Nomura | |
| 9,569,622 B2 | 2/2017 | Dover | |
| 9,613,214 B2 | 4/2017 | Dover | |
| 10,836,402 B2 | 11/2020 | Golov | |
| 10,933,882 B2 | 3/2021 | Golov | |
| 10,981,576 B2 | 4/2021 | Golov | |
| 11,507,175 B2 | 11/2022 | Golov | |
| 2006/0212195 A1 | 9/2006 | Veith et al. | |
| 2009/0210777 A1 | 8/2009 | Weiberle et al. | |
| 2012/0102477 A1* | 4/2012 | Kim | G06F 8/654 717/169 |
| 2013/0007345 A1 | 1/2013 | Barbou-des-Places et al. | |
| 2013/0166866 A1* | 6/2013 | Yerushalmi | G06F 1/3275 711/E12.001 |
| 2013/0232366 A1 | 9/2013 | Nishijima | |
| 2014/0075087 A1 | 3/2014 | Bartling et al. | |
| 2014/0140135 A1 | 5/2014 | Okano et al. | |
| 2014/0208151 A1 | 7/2014 | Fernandez | |
| 2014/0229724 A1 | 8/2014 | Chen et al. | |
| 2015/0089287 A1 | 3/2015 | Jayakumar et al. | |
| 2015/0094899 A1 | 4/2015 | Hackenberg et al. | |
| 2015/0280919 A1 | 10/2015 | Cullen et al. | |
| 2015/0331055 A1 | 11/2015 | Oi et al. | |
| 2016/0162422 A1 | 6/2016 | Weber | |
| 2016/0349692 A1* | 12/2016 | Tomimatsu | H04N 1/00899 |
| 2017/0075352 A1 | 3/2017 | Nordbruch | |
| 2017/0180929 A1 | 6/2017 | Cavendish et al. | |
| 2017/0300052 A1 | 10/2017 | Harda et al. | |
| 2017/0361712 A1 | 12/2017 | Terao et al. | |
| 2018/0074718 A1 | 3/2018 | Lee | |
| 2018/0086267 A1* | 3/2018 | Nix | B60R 1/002 |
| 2018/0203622 A1 | 7/2018 | Ishiguro | |
| 2019/0193745 A1 | 6/2019 | Golov | |
| 2019/0193746 A1 | 6/2019 | Golov | |
| 2019/0193747 A1 | 6/2019 | Golov | |
| 2019/0317864 A1 | 10/2019 | Ma | |
| 2020/0142472 A1 | 5/2020 | Golov | |
| 2021/0046944 A1 | 2/2021 | Golov | |
| 2021/0163024 A1 | 6/2021 | Golov | |
| 2021/0229684 A1 | 7/2021 | Golov | |

OTHER PUBLICATIONS

International Search Report and Written Opinion, PCT/US2019/058936, mailed Feb. 21, 2020.
Sandeep Kaushik, Yervant Zorian, "Embedded memory test and repair optimizes SoC yields", Jul. 17, 2012.
Determination of Reliability of Vehicle Control Commands via Memory Test U.S. Appl. No. 17/208,612, filed Mar. 22, 2021, Gil Golov.
Determination of Reliability of Vehicle Control Commands using a Voting Mechanism, U.S. Appl. No. 17/172,946, filed Feb. 10, 2021, Gil Golov.
Data Link between Volatile Memory and Non-volatile Memory, U.S. Appl. No. 16/179,072, filed Nov. 2, 2018, Gil Golov.
Tosson, Amr M.S., et al., "8T1R: A Novel Low-power High-speed RRAM-based Non-volatile SRAM Design." 2016 International Great lakes Symposium on VLSI(GLSVLSI), ACM, Aug. 15, 2016.
Wang, Jiachun, "Locomotive CCU Board Design and Development Based on SAMA5D35." China's Excellent Master's Thesis Full-text Database Engineering Science and Technology II, Abstract only, Sep. 15, 2014.

* cited by examiner

DATA LINK BETWEEN VOLATILE MEMORY AND NON-VOLATILE MEMORY

RELATED APPLICATIONS

The present application is a continuation application of U.S. patent application Ser. No. 16/179,072 filed Nov. 2, 2018, the entire disclosure of which application is hereby incorporated herein by reference.

This application is related to U.S. Non-Provisional application Ser. No. 16/156,835, filed 10 Oct. 2018, entitled "MEMORY MAPPING FOR HIBERNATION," by Gil Golov, the entire contents of which application is incorporated by reference as if fully set forth herein.

This application is also related to U.S. Non-Provisional application Ser. No. 16/150,618, filed 3 Oct. 2018, entitled "AUTOMATIC COLLECTION OF AUTONOMOUS VEHICLE LOGGING DATA," by Junichi Sato, the entire contents of which application is incorporated by reference as if fully set forth herein.

FIELD OF THE TECHNOLOGY

At least some embodiments disclosed herein relate to computing systems in general, and more particularly, data transfer in a computing system including volatile memory and non-volatile memory.

BACKGROUND

Hibernation for computing systems is, for example, the powering down of a computer while retaining its state. After entering hibernation, the computer saves the contents of its random access memory (RAM) to a hard disk or other non-volatile storage. When resuming operation, the computer is in the same state as it was before entering hibernation.

After hibernating, the hardware can be powered down similar to a regular shutdown of the computer. Hibernation is one way of avoiding the need to save unsaved data before shutting down, and then restoring all running programs after powering up the computer again. Hibernation can be used, for example, in laptops, which have limited battery power available. In some cases, hibernation can be triggered automatically based on a low battery alarm. Many desktop computers support hibernation as an energy saving feature.

BRIEF DESCRIPTION OF THE DRAWINGS

The present disclosure will be understood more fully from the detailed description given below and from the accompanying drawings of various embodiments of the disclosure.

DETAILED DESCRIPTION

At least some aspects of the present disclosure are directed to a data transfer process for use in a computing system and in which the process copies data from volatile memory to non-volatile memory. In one example, the data transfer process is performed during a hibernation process.

Hibernation enables a computer to power down yet retain its states (e.g., the states of software processes executing on the computer). When powering down, the contents of volatile memory (e.g., RAM) is copied to a non-volatile memory (e.g., a solid-state drive (SSD)). When powering up, the saved data content is copied back from the non-volatile memory to the volatile memory. As a result, the computer continues to operate exactly from the point as it was operating before hibernating.

Existing approaches to hibernation use a processing unit (e.g., a system on chip (SOC) or CPU) to manage the data transfer. The processing unit interfaces to both the non-volatile memory (NVM) and the volatile memory (e.g., DRAM). The processing unit manages the data transfer between the devices during the hibernating process, and there is no direct link between those devices.

It has been recognized that several technical problems can exist due to hibernation that is managed by a processing unit as described above. For example, hibernation can consume significant power if, for example, large quantities of data need to be copied as the processing unit itself often consumes significant power to manage the transfer. If a system operates on batteries, or is operating on backup power, the processing unit may consume a large proportion of the available power. This may prevent the system from completing the hibernation or other data transfer process (e.g., the power source may become fully depleted).

At least some aspects of the present disclosure address the above and other deficiencies by having, for example, a data link connect the volatile memory and the non-volatile memory. A direct data transfer is managed between the volatile memory and the non-volatile memory without using the processing unit.

In one embodiment, a controller, state machine, and/or a processing unit (e.g., using a significantly smaller chip area as compared to a host system processing unit, such as used in the approach earlier described above) are added to, or used with, the volatile memory and the non-volatile memory devices. The controller, state machine, and/or a processing unit can be either an internal or external device. For example, an external controller can send commands to both a volatile memory chip and a non-volatile memory chip to implement the data transfer.

In one embodiment, the external controller receives a signal from a processing unit of a host system that initiates the data transfer. After receiving the signal, the external controller takes over the data transfer process and performs copying of data from the volatile memory to the non-volatile memory independently of the host processing unit. For example, the external controller does not need to communicate with the host processing unit during the data transfer process.

In one embodiment, after the host processing unit sends the signal to the external controller that starts the data transfer, power to the host processing unit can be reduced to a lower level, or can be shut off completely in order to save power. For example, it may be desirable to reduce power consumption if a primary power source has been lost. In one example, the primary power is lost due to an accident that involves a computing system. In one example, a power cut or loss triggers a computing system to hibernate, and an energy-limited backup power source supplies power during the hibernating process.

For example, an autonomous vehicle that is in a collision may lose its primary power source. In such a situation, it is desirable to save certain data associated with operation of the autonomous vehicle shortly before and during the collision. This data can be saved using a data transfer process handled by an external controller as described above.

In another example, the data transfer process can be handled by internal controllers. For example, the volatile memory can have a dedicated internal controller used to manage the data transfer at the volatile memory. This internal controller can communicate with another internal controller that is in the non-volatile memory chip. The two internal controllers can communicate to implement the data transfer process. Communication between the internal controllers can occur, for example, over either a parallel or serial link.

During the data transfer process, various types of information can be copied. For example, the volatile memory can include various memory regions to be copied. Examples of typically more critical memory regions that can be copied during the data transfer process include data associated with the operating system, software, software stacks, program variables, etc. Some of this data such as program variables is generated at run-time by one or more software processes executing on one or more processing devices.

Examples of typically less critical memory regions that can be copied include regions storing data for graphics video buffers, camera input buffers, artificial graphics, deep learning temporary calculations, etc. Such data is typically generated at run-time by one or more software processes during normal operations of the computer.

Thus, various embodiments of the present disclosure provide a data transfer component that reduces power consumption of a computing system when performing a data transfer process and that provides certain advantages. For example, the data transfer component can reduce the energy that is used during the data transfer process (e.g., by shutting down a host processing unit, and/or reducing power to or shutting down other sub-systems). This can be an advantage when the computing system is being operated on backup power or batteries.

The data transfer component of the present disclosure can be implemented in various computing systems. In one example system, a processing device (e.g., a system-on-chip (SOC), FPGA, CPU, or GPU) stores run-time data in a volatile memory device(s) (e.g., a DRAM device). The data transfer component can copy data from the volatile memory to non-volatile memory (e.g., cross point memory (such as 3DXP memory) or a SSD).

Figure 1:
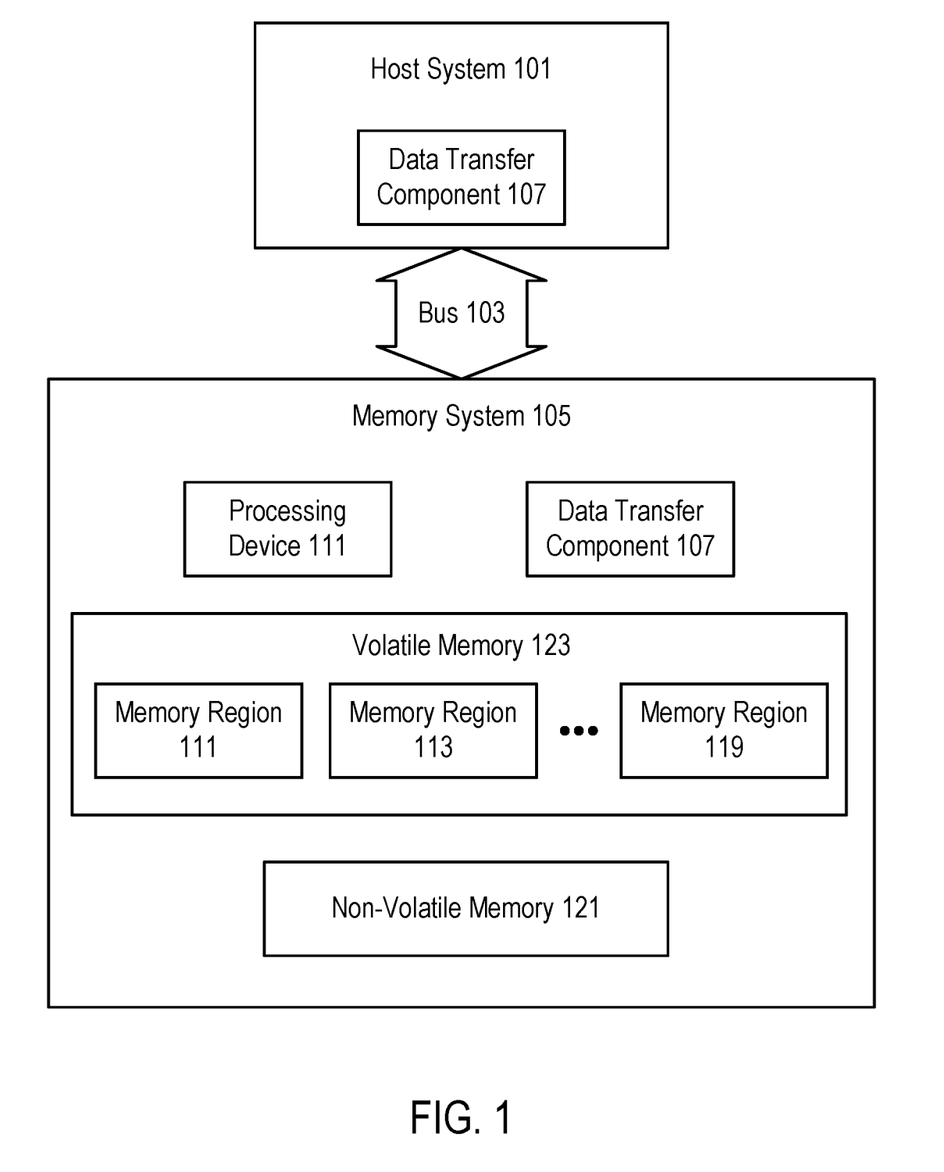
FIG. 1 illustrates an example computing system having a data transfer component, in accordance with some embodiments of the present disclosure.

FIG. 1 illustrates an example computing system having a data transfer component 107, in accordance with some embodiments of the present disclosure. A host system 101 communicates over a bus 103 with a memory system 105. A processing device 111 of memory system 105 has read/write access to memory regions 111, 113, . . . , 119 of volatile memory 123. In one example, host system 101 reads data from and writes data to volatile memory 123.

In one example, the processing device 111 and the memory regions 111, 113, . . . , 119 are on the same chip or die. In some embodiments, the memory regions store data used by the host system 101 and/or the processing device 111 during machine learning processing or other run-time data generated by software process(es) executing on host system 101 or on processing device 111.

The computing system includes a data transfer component 107 in the memory system 105 that can copy one or more memory regions of the memory system 105. The computing system 100 can further include a data transfer component 107 in the host system 120 that coordinates with the data transfer component 107 in the memory system 105 to at least facilitate data transfer including copying of memory regions.

In various embodiments, the data transfer component 107 copies one or more memory regions of volatile memory 123 to non-volatile memory 121. For example, a data transfer process can by handled by a dedicated processing device used for direct data transfer between memory devices without needing to be managed by a central processing unit of a host system (e.g., host system 101).

In one embodiment, a processing device (not shown) such as a controller of host system 101 determines that an event has occurred in at least one computing system (e.g., a computer system that is being monitored and/or controlled by host system 101). In response to determining that the event has occurred, the controller of host system 101 initiate the transfer of data that will be controlled by processing device 111 of memory system 105. During this data transfer process, data stored in volatile memory 123 will be copied to non-volatile memory 121.

After the controller of host system 101 initiates the transfer of data, power to the controller of host system 101 and/or other portions of host system 101 can be reduced or terminated. Also, in response to determining that the event has occurred, the source of power used by processing device 111 can be switched to a backup power source.

In some embodiments, host system 101 can determine a priority ordering for copying memory regions in volatile memory 123 (e.g., based on monitoring of collected data). In one example, volatile memory 123 is used as system memory for a processing device (not shown) of host system 101. In one embodiment, a process of host system 101 determines a priority ordering of memory regions to copy by monitoring how the memory regions are used (e.g., used by software processes). For example, the host system 101 can order memory regions based on the context of memory allocation requests received from one or more software processes.

In some embodiments, processing device 111 includes at least a portion of the data transfer component 107. In other embodiments, or in combination, the processing device 111 and/or a processing device in the host system 101 includes at least a portion of the data transfer component 107. For example, processing device 111 and/or a processing device of the host system 101 can include logic circuitry implementing certain portions of the data transfer component 107. For example, a controller or processing device (processor) of the host system 101, can be configured to execute instructions stored in memory for performing the operations of certain of the steps of the data transfer component 107 described herein.

In some embodiments, the data transfer component 107 is implemented in an integrated circuit chip disposed in the memory system 105. In other embodiments, portions of the data transfer component 107 in the host system 120 can be part of an operating system of the host system 120, a device driver, or an application.

An example of memory system 105 is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory system can be a hybrid memory/storage system that provides both memory functions and storage functions. In general, a host system can utilize a memory system that includes one or more memory regions. The host system can provide data to be stored at the memory system and can request data to be retrieved from the memory system. In one example, a host can access various types of memory, including volatile and non-volatile memory.

The host system 101 can be a computing device such as a controller in a vehicle, a network server, a mobile device, a cellular telephone, an embedded system (e.g., an embedded system having a system-on-chip (SOC) and internal or external memory), or any computing device that includes a memory and a processing device. The host system 101 can include or be coupled to the memory system 105 so that the host system 101 can read data from or write data to the memory system 105. The host system 101 can be coupled to the memory system 105 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 101 and the memory system 105. The physical host interface can provide an interface for passing control, address, data, and other signals between the memory system 105 and the host system 101. FIG. 1 illustrates a memory system 105 as an example. In general, the host system 101 can access multiple memory systems via a same communication connection, multiple separate communication connections, and/or a combination of communication connections.

The host system 101 can include a processing device and a controller (not shown). The processing device of the host system 101 can be, for example, a microprocessor, a central processing unit (CPU), a processing core of a processor, an execution unit, etc. In some instances, the controller of the host system can be referred to as a memory controller, a memory management unit, and/or an initiator. In one example, the controller controls the communications over bus 103 between the host system 101 and the memory system 105.

A controller of the host system 101 can communicate with a controller of the memory system 105 to perform operations such as reading data, writing data, or erasing data at the memory regions of volatile memory 123. In some instances, the controller is integrated within the same package of the processing device 111. In other instances, the controller is separate from the package of the processing device 111. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

In one embodiment, the memory regions 111, 113, ..., 119 can include any combination of different types of volatile memory components. In some embodiments, the memory regions can be, but are not limited to, random access memory (RAM), dynamic random access memory (DRAM), and synchronous dynamic random access memory (SDRAM). Furthermore, the memory cells of the memory regions can be grouped as memory pages or data blocks that can refer to a unit used to store data. In some embodiments, the memory map can flag memory pages or data blocks to indicate copying is to be done during hibernation.

In one embodiment using data transfer component 107, one or more controllers of the memory system 105 can communicate with the memory regions 111, 113, ..., 119 to perform operations such as reading data, writing data, or erasing data. Each controller can include hardware such as one or more integrated circuits and/or discrete components, a buffer memory, or a combination thereof. Each controller can be a microcontroller, special purpose logic circuitry (e.g., a field programmable gate array (FPGA), an application specific integrated circuit (ASIC), etc.), or another suitable processor. The controller(s) can include a processing device (processor) configured to execute instructions stored in local memory. In one example, local memory of the controller includes an embedded memory configured to store instructions for performing various processes, operations, logic flows, and routines that control operation of the memory system 105, including handling communications between the memory system 105 and the host system 101. In some embodiments, the local memory can include memory registers storing memory pointers, fetched data, etc. The local memory can also include read-only memory (ROM) for storing micro-code.

In general, controller(s) of memory system 105 can receive commands or operations from the host system 101 and/or processing device 111 and can convert the commands or operations into instructions or appropriate commands to achieve the data transfer for the identified memory regions. The controller can also be responsible for other operations such as wear leveling operations, garbage collection operations, error detection and error-correcting code (ECC) operations, encryption operations, caching operations, and address translations between a logical block address and a physical block address that are associated with the memory regions. The controller can further include host interface circuitry to communicate with the host system 101 via the physical host interface. The host interface circuitry can convert the commands received from the host system into command instructions to access one or more of the memory regions as well as convert responses associated with the memory regions into information for the host system 101.

The memory system 105 can also include additional circuitry or components that are not illustrated. In some embodiments, the memory system 105 can include a cache or buffer (e.g., DRAM or SRAM) and address circuitry (e.g., a row decoder and a column decoder) that can receive an address from one or more controllers and decode the address to access the memory regions.

In some embodiments, a controller in the host system 101 or memory system 105, and/or the processing device 111 includes at least a portion of the data transfer component 107. For example, the controller and/or the processing device 111 can include logic circuitry implementing portions of the data transfer component 107. For example, a processing device (processor) can be configured to execute instructions stored in memory for performing operations that provide read/write access to memory regions for the data transfer component 107 as described herein. In some embodiments, the data transfer component 107 is part of an operating system, a device driver, or an application.

Figure 2:
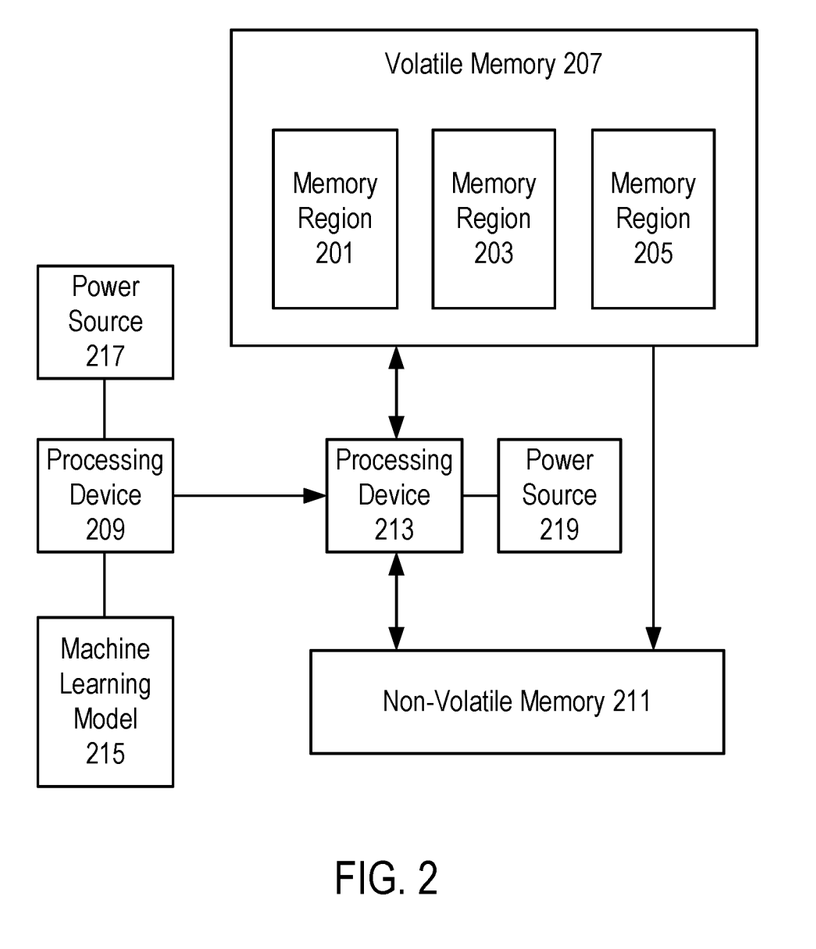
FIG. 2 illustrates an example computing system that transfers data from volatile memory to non-volatile memory, in accordance with some embodiments of the present disclosure.

FIG. 2 illustrates an example computing system that transfers data from volatile memory 207 to non-volatile memory 211, in accordance with some embodiments of the present disclosure. For example, one or more of memory regions 201, 203, 205 of volatile memory 207 can be copied to non-volatile memory 211 during a data transfer process. The data transfer process is controlled by processing device 213, which communicates with volatile memory 207 and non-volatile memory 211 (e.g., processing device 213 sends commands to read and write data).

In one example, volatile memory 207 includes DRAM and/or SRAM. In one example, processing device 213 is a state machine that sends commands to the volatile memory 207 (e.g., read commands to read a block of data).

Data transfer by processing device 213 is initiated by a signal sent by processing device 209 to processing device 213. The signal can be sent in response to various events as determined by processing device 209. For example, a machine learning model 215 can provide a result to processing device 209. The signal can be sent in response to the result.

In one embodiment, the machine learning model 215 receives inputs based on data received from various computing systems. In one example, the data is sensor data received from vehicle systems of an autonomous vehicle.

Processing device 209 is powered by a power source 217. A power source 219 provides power to processing device 213. In some embodiments, power source 219 is a backup power source, and processing device 213 receives primary power from power source 217.

In one embodiment, processing device 209 detects a loss or an impending loss of power from power source 217. In response to this detection, processing device 209 sends a signal to processing device 213 that initiates the data transfer process above. In some cases, processing device 209 can reduce power to other sub-systems in response to detecting the loss of power.

In one embodiment, the machine learning model 215 monitors data associated with power source 217. An output from machine learning model 215 can be used by processing device 209 as a basis for initiating data transfer by processing device 213 and/or managing the allocation of power to processing devices from power source 217 and/or power source 219 (e.g., allocation in real-time during the data transfer process).

Volatile memory 207 is an example of volatile memory 123. In one example, processing device 209 can be in host system 101. Non-volatile memory 211 is an example of non-volatile memory 121. In one example, non-volatile memory 211 is flash memory and/or a solid-state drive (SSD).

In one embodiment, system memory used by processing device 209 resides in volatile memory 207. Processing device 209 can initiate a data transfer process in response to various events (e.g., a detection of a loss of power to a memory or other component of the computing system). Copying of data from more critical regions of volatile memory 207 can be performed before copying of any other data, or alternatively no other data is copied. The copying is handled under control of processing device 213 (e.g., processing device 209 can hand over control to a direct memory access controller for copying of some or all of the memory regions to non-volatile memory 211).

In one embodiment, a host system (e.g., host system 101) can collect data from sensors of an embedded system. For example, the sensors can be located on an autonomous vehicle and collect image data used for navigation of the vehicle. In one embodiment, the sensor data is input to machine learning model 215 (e.g., a neural network) and an output is used to control the vehicle. In one embodiment, the processing associated with a neural network is performed by processing device 209, either alone or in conjunction with a processing device of the host system. Data generated during this processing can be identified as being stored in one or more critical memory regions for higher priority when copying during the data transfer process.

In one embodiment, a neural network is trained or operated using processing device 209. During training or other operation of the neural network, data is read from and written to volatile memory 207. Data associated with the neural network can be flagged as critical, non-critical, or not flagged.

In one embodiment, the processing device 209 and the volatile memory 207 are disposed on the same chip or die, and the processing device 209 uses stored data from volatile memory as an input to a computer model for machine learning. In one embodiment, the computer model is a neural network. In one embodiment, the processing device 209 provides data as an output from the computer model.

In one embodiment, controller(s) used to access volatile memory 207 can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or another suitable processor. The controller can include one or more processors (processing devices) configured to execute instructions stored in local memory.

Local memory of the controller can include an embedded memory configured to store instructions for performing various processes, operations, logic flows, and routines that control aspects of operation for the memory system. Local memory of the controller can include read-only memory (ROM) for storing micro-code and/or memory registers storing, for example, memory pointers, fetched data, etc.

Figure 3:
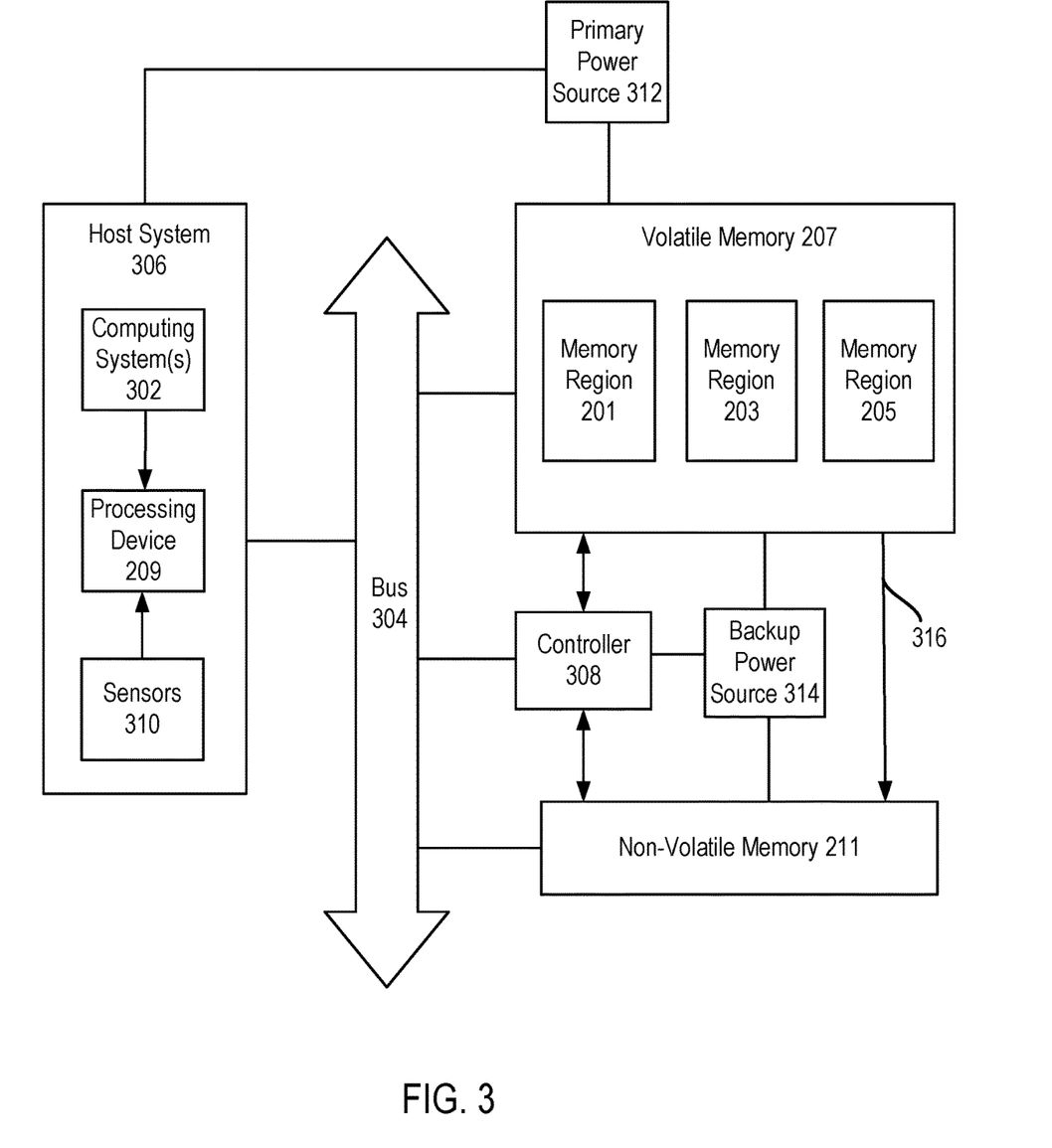
FIG. 3 illustrates an example computing system having a host system that initiates a data transfer process handled by an independent controller, in accordance with some embodiments of the present disclosure.

FIG. 3 illustrates an example computing system having a host system 306 that initiates a data transfer process handled by an independent controller 308, in accordance with some embodiments of the present disclosure. In one embodiment, host system 306 stores critical run-time data in volatile memory 207 prior to the data transfer process. After a data transfer process is initiated, data in one or more memory regions is copied from volatile memory 207 to non-volatile memory 211. In one example, controller 308 controls volatile memory 207 and non-volatile memory 211 during the data transfer process.

A data link 316 is used to copy data from volatile memory 207 to non-volatile memory 211. Data link 316 is, for example, a serial or a parallel communication link.

Controller 308 is an example of processing device 213. Controller 308 receives power from backup power source 314 whenever its primary power source fails. Backup power source 314 is an example of power source 219.

Host system 306, volatile memory 207, controller 308, and/or non-volatile memory 211 can communicate during normal operation over a bus 304. For example, processing device 209 sends commands to volatile memory 207 to read and write data generated during normal operation.

Processing device 209 of host system 306 monitors various types of data collected from sensors 310 and one or more computing systems 302. Based on monitoring this collected data, processing device 209 determines that an event has occurred. For example, the event can be associated with the operation of one or more of computing systems 302. In one example, sensors 310 include one or more accelerometers of an autonomous vehicle.

In response to determining that an event has occurred, processing device 209 initiates a transfer of data by sending a signal over bus 304 to controller 308. In response to receiving the signal, controller 308 takes over handling of the data transfer from volatile memory 207 to non-volatile memory 211. Controller 308 controls copying of data during the data transfer independently of processing device 209.

After sending the signal to initiate the transfer of data, power to processing device 209 is reduced or terminated. In one example, power from a primary power source 312 is shut off. However, power can be maintained to volatile memory 207 from primary power source 312 even after shutting off power to one or more components of host system 306.

In one embodiment, even though power is reduced or terminated to host system 306, controller 308 can use bus 304 to perform the data transfer process in which data is copied from volatile memory 207 to non-volatile memory 211. In some cases, data can be copied using both bus 304 and data link 316.

In one embodiment, backup power source 314 can provide power to one or more of controller 308, volatile memory 207, and non-volatile memory 211. Based on monitoring collected data, processing device 209 can control the allocation of power to these various components. In another embodiment, controller 308 can control allocation of such power based on data received from processing device 209 and/or other data collected by controller 308.

In one embodiment, the data transfer process is performed as part of a hibernation process. After the computing system has hibernated, normal operation can be restored by copying data from non-volatile memory 211 to corresponding memory regions in volatile memory 201.

Figure 4:
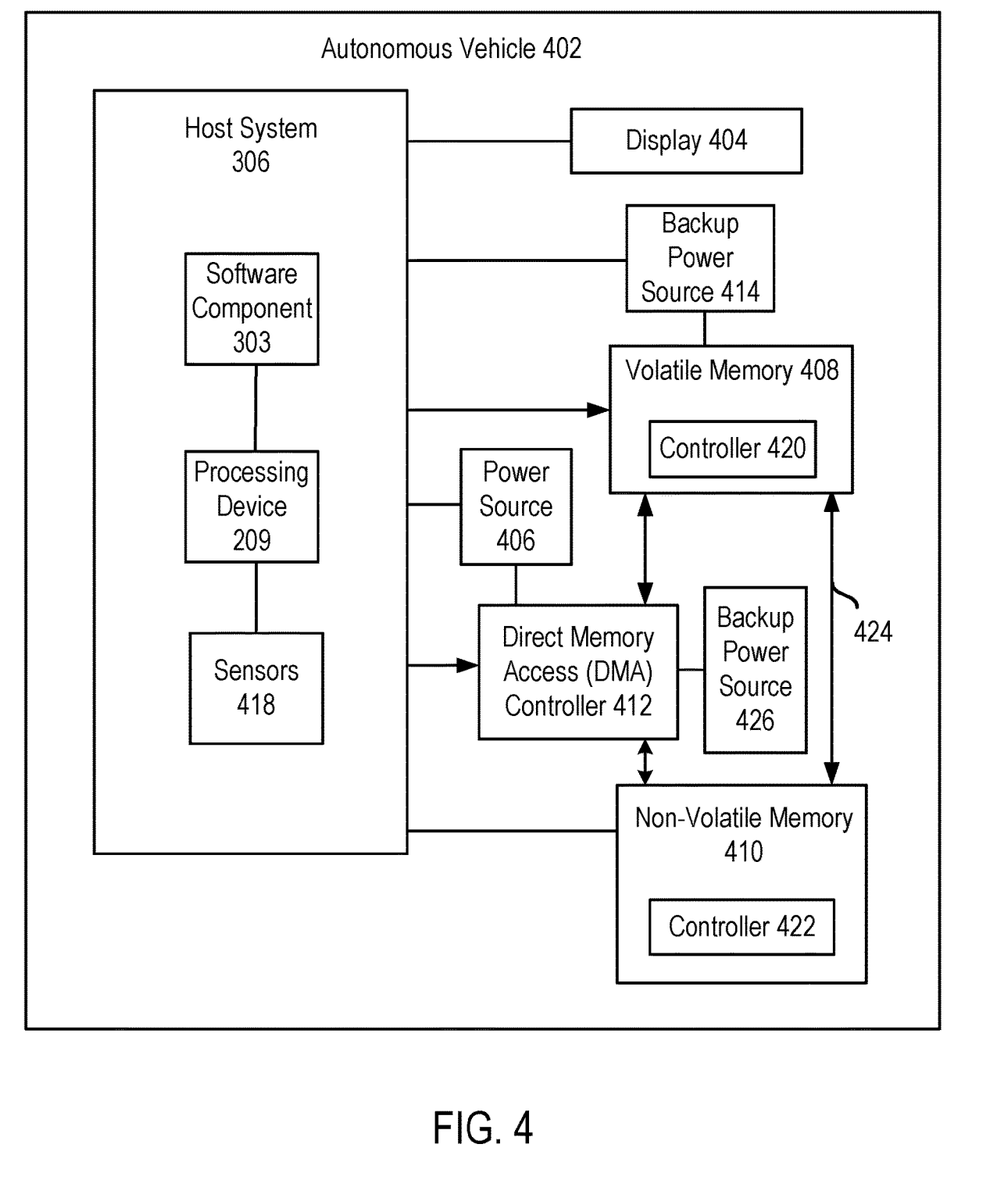
FIG. 4 illustrates an example autonomous vehicle having a host system that monitors collected data and initiates a data transfer process based on the monitoring, in accordance with some embodiments of the present disclosure.

FIG. 4 illustrates an example autonomous vehicle 402 that includes the host system 306. Host system 306 monitors collected data and initiates a data transfer process based on the monitoring, in accordance with some embodiments of the present disclosure. In one embodiment, the collected data is generated or collected by a software component 303 and/or is sensor data received from sensors 418. Sensors 418 are an example of sensors 310. Autonomous vehicle 402 is, for example, a car, truck, boat, plane, helicopter, or unmanned aerial vehicle (e.g., a drone).

In one embodiment, volatile memory 408 stores critical run-time data generated by a software component 303 of host system 306 prior to initiating the data transfer. Volatile memory 408 is an example of volatile memory 123 or volatile memory 207.

During the data transfer process, data is copied from volatile memory 408 to non-volatile memory 410. For example, data can be copied over a dedicated data link 424 under control of direct memory access (DMA) controller 412.

In one embodiment, processing device 209 initiates the data transfer process. In order to initiate the data transfer process, processing device 209 sends a signal to direct memory access controller 412. In response to receiving the signal, DMA controller 412 takes over copying of some or all data in the memory regions from volatile memory 408 to non-volatile memory 410. Processing device may send data to DMA controller 412 that indicates memory regions to copy and/or provide data that is evaluated by DMA controller 412 to determine memory regions to copy.

In one example, the use of DMA controller 412 enables certain hardware subsystems to access main system memory (e.g., RAM) independently of a central processing unit (CPU). In one example, DMA controller 412 can be used for memory to memory copying or moving of data within memory. In one example, the DMA controller offloads memory operations from the processing device 209 (e.g., a CPU). In one example, the CPU can initialize the DMA controller (e.g., with a count of the number of words to transfer, and the starting memory address to use). The DMA controller can increment an internal address register until, for example, a full block of data is transferred.

In one example, DMA controller 412 is used to copy data from volatile memory 408 to non-volatile memory 410. Host system 306 sends a signal to DMA controller 412 that initiates handling of the copying by DMA controller 412. In addition to the signal, the host system 306 can communicate data that indicates a priority ordering of the memory regions of volatile memory 408 to be copied (e.g., identified memory regions are copied first). The memory regions can be identified, for example, by providing physical addresses from the host system 306 to the DMA controller 412. In one example, DMA controller 412 is a separate component.

In one embodiment, after DMA controller 412 is set up to handle the copying, power to processing device 209 and/or host system 306 can be shut off to save energy. In one embodiment, copying of memory regions by the DMA controller 412 can be delayed. For example, delaying the DMA operation is possible if a portion of DRAM is still powered up during the initial data transfer. To shut down this portion of DRAM (e.g., when the data transfer is long or expected to be long), DMA operations are executed. From the user's point of view, the computing system is already in, for example, hibernation, while the DMA copying operation is running. The user does not have to wait (e.g., no further response is required from the user to complete the data transfer process).

In one embodiment, the identification of critical/non-critical data within volatile memory 408 may be based on a memory allocation procedure. For example, one routine can be used to request memory for storing critical data; and another routine can be used to request memory for storing non-critical data. Thus, the computing system (e.g., host system 306) knows which memory content needs to be backed up to non-volatile memory (e.g., SSD), and which can be discarded. Alternatively, when a memory allocation is requested, the requester can specify a characterization of the memory (e.g., one category selected from a plurality of categories, such as video data, disposable data, input buffer, output buffer, etc.). The computing system can be customized to selectively classify a set of categories as non-critical. The non-critical data may be discarded or not backed up during data transfer.

In one embodiment, host system 306 provides data for displaying graphical images on display 404 for a user of autonomous vehicle 402. Memory regions storing data corresponding to the presented display can be identified as being critical (e.g., to be copied before non-critical memory regions). In one case, vehicle 402 is shut down by the user. Host system 306 initiates the data transfer process in response to this user shutdown. During the data transfer process, data corresponding to the presented display is copied to non-volatile memory 410 due to being marked as critical.

In one embodiment, a backup power source 414 is used to provide backup power to volatile memory 408. Host system 306 is configured to detect an impending loss of power from backup power source for 414. In response to detecting the impending loss of power, host system 306 can initiate a data transfer process by which data stored in identified memory regions of volatile memory 408 is copied to non-volatile memory 410.

In one example, from a hardware point of view, a portion of RAM (e.g., volatile memory 408) may be power-backed. This portion can be allocated as critical data. Backing up this portion of RAM to a SSD can be delayed or eliminated, based on power management. For example, this part of RAM can be backed up when the battery power is below a threshold, or the computing system has been in data transfer for more than a threshold period of time. Also, a prediction of the data transfer time (e.g., based on past usage and/or an artificial neural network (ANN) model) can be used to determine whether or not to back up this critical data. Power management regarding data transfer can have different levels: discarding the non-critical data and cutting the power to the non-critical RAM, setting up for DMA operation for background backing up of critical data, and/or delaying DMA operations until it is determined that the data transfer is long (e.g., exceeds a predetermined time period) or expected to be long.

In one embodiment, a controller 420 is an internal controller of volatile memory 408, and a controller 422 is an internal controller of non-volatile memory 410. Controllers 420 and 422 can be used in addition to and/or instead of DMA controller 422 handle the data transfer process.

In one embodiment, host system 306 and/or DMA controller 412 are powered by power source 406. DMA controller 412 is connected to a backup power source 426. Host system 306 can allocate power usage by power source 406 to prioritize DMA controller 412 over host system 306. In one example, allocating power includes reducing or turning off power to processing device 209 and/or one or more other components of autonomous vehicle 402. Power source 406 is an example of power source 217 or primary power source 312.

Figure 5:
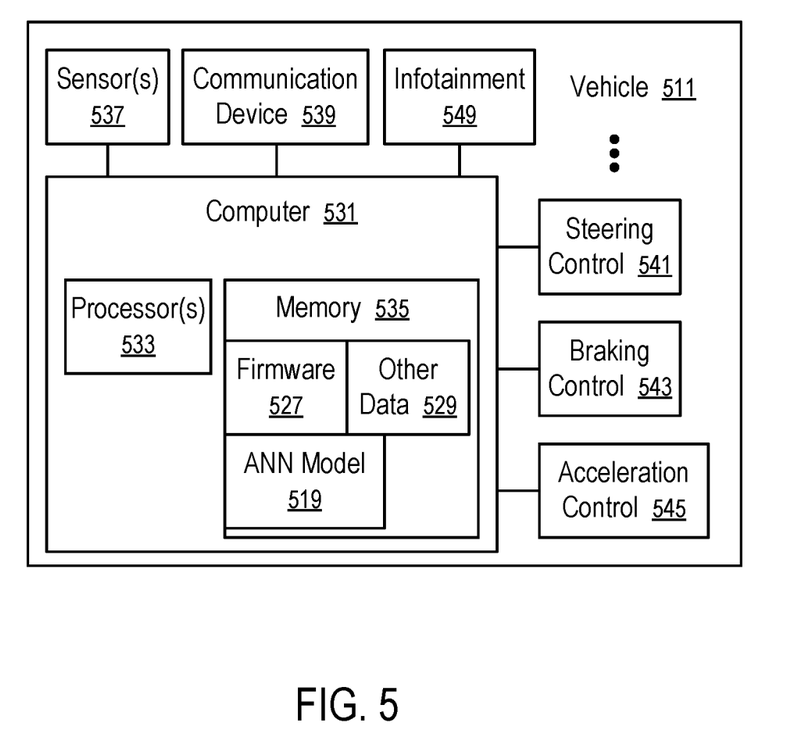
FIG. 5 illustrates an example of a vehicle configured using an artificial neural network (ANN) model, according to one embodiment.

FIG. 5 illustrates an example of a vehicle 511 configured using an artificial neural network (ANN) model 519, according to one embodiment. ANN model 519 is an example of machine learning model 215. Vehicle 511 is an example of autonomous vehicle 402.

The vehicle 511 includes an infotainment system 549, a communication device 539, one or more sensors 537, and a computer 531 that is connected to some controls of the vehicle 511, such as a steering control 541 for the direction of the vehicle 511, a braking control 543 for stopping of the vehicle 511, an acceleration control 545 for the speed of the vehicle 511, etc.

The computer 531 of the vehicle 511 includes one or more processors 533, memory 535 storing firmware (or software) 527, the ANN model 519, and other data 529. Computer 531 is an example of host system 306.

In one example, firmware 527 is updated by an over-the-air update in response to a communication from another host system (e.g., server) sent in response to identifying faulty software. Alternatively, and/or additionally, other firmware of various computing devices or systems of vehicle 511 can be updated.

The one or more sensors 537 may include a visible light camera, an infrared camera, a LIDAR, RADAR, or sonar system, and/or peripheral sensors, which are configured to provide sensor input to the computer 531. A module of the firmware (or software) 527 executed in the processor(s) 533 applies the sensor input to an ANN defined by the model 519 to generate an output that identifies or classifies an event or object captured in the sensor input, such as an image or video clip. Data from this identification and/or classification can be included in data collected by a memory device and sent from a vehicle to the server.

Alternatively, and/or additionally, identification of unsafe software can be used by an autonomous driving module of the firmware (or software) 527 to generate a response. The response may be a command to activate and/or adjust one of the vehicle controls 541, 543, and 545. In one embodiment, the response is an action performed by the vehicle where the action has been configured based on an update command from the server (e.g., the update command can be generated by the server in response to determining that software of vehicle 511 is faulty based on analysis of event data). In one embodiment, prior to generating the control response, the vehicle is configured. In one embodiment, the configuration of the vehicle is performed by updating firmware of vehicle 511. In one embodiment, the configuration of the vehicle includes updating of the computer model stored in vehicle 511 (e.g., ANN model 519).

In one embodiment, the server stores received sensor input as part of sensor data for further training or updating of the ANN model 519 using an supervised training module. When an updated version of the ANN model 519 is available in the server, the vehicle 511 may use the communication device 539 to download the updated ANN model 519 for installation in the memory 535 and/or for the replacement of the previously installed ANN model 519. These actions may be performed in response to determining that vehicle 511 is failing to properly detect objects and/or in response to identifying unsafe software.

In one example, the outputs of the ANN model 519 can be used to control (e.g., 541, 543, 545) the acceleration of a vehicle (e.g., 511), the speed of the vehicle 511, and/or the direction of the vehicle 511, during autonomous driving.

In one example, data obtained from a sensor of a vehicle may be an image that captures an object using a camera that images using lights visible to human eyes, or a camera that images using infrared lights, or a sonar, radar, or LIDAR system. In one embodiment, image data obtained from at least one sensor of the vehicle is part of the collected data from the vehicle that is analyzed. In some instances, the ANN model is configured for a particular vehicle based on the sensor and other collected data. In one example, the data obtained from one or more sensors of the vehicle can be stored in volatile memory 207 or volatile memory 408.

Figure 6:
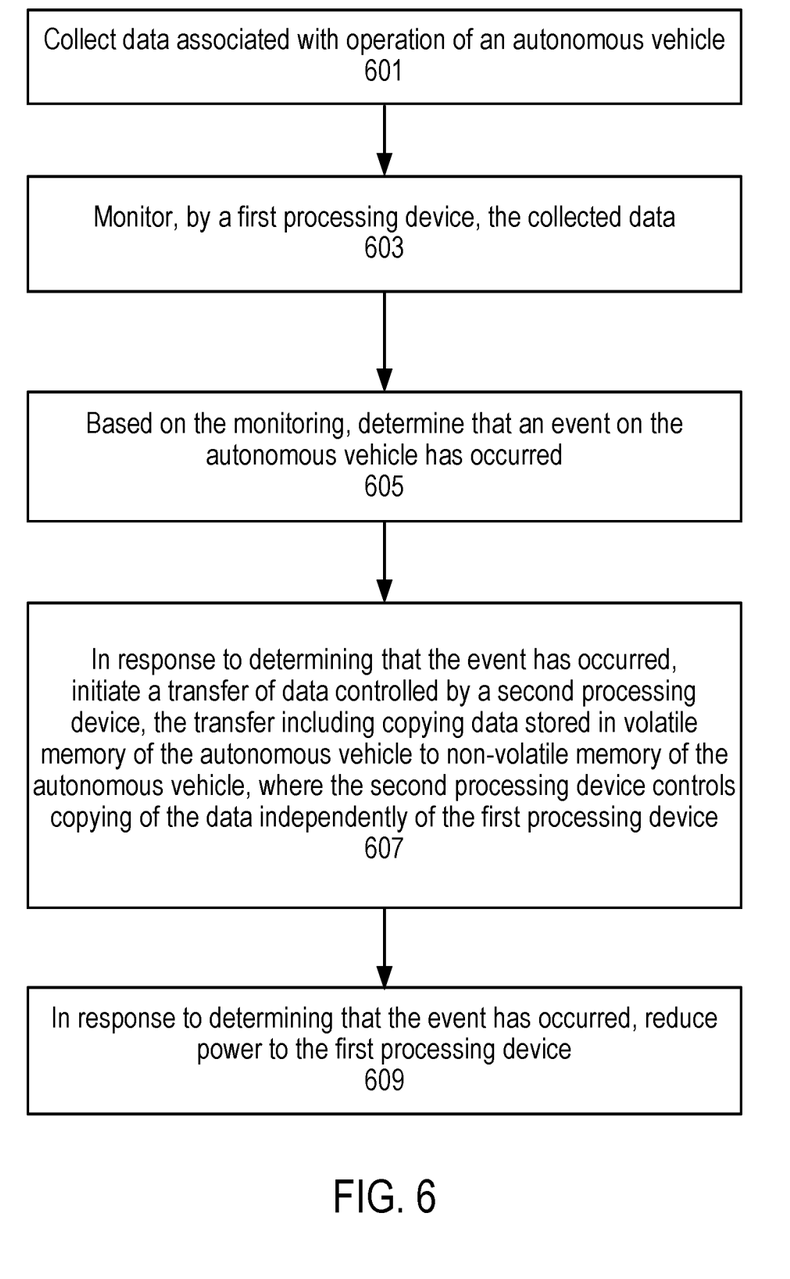
FIG. 6 is a flow diagram of an example method of data transfer from volatile memory to non-volatile memory, in accordance with some embodiments of the present disclosure.

FIG. 6 is a flow diagram of an example method of data transfer from volatile memory to non-volatile memory, in accordance with some embodiments of the present disclosure. For example, the method of FIG. 6 can be implemented in the system of FIGS. 1-5.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by the data transfer component 107 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, data associated with operation of an autonomous vehicle is collected. In other embodiments, the data can be collected from one or more other types of computing systems. In an example for an autonomous vehicle, data can be collected from one or more computing systems 302, sensors 310, sensors 418, software component 303, and/or machine learning model 215.

At block 603, the collected data is monitored by a first processing device. For example, processing device 209 can monitor the collected data.

At block 605, based on the monitoring, a determination is made that an event on the autonomous vehicle or other computing system has occurred. For example, processing device 209 can determine that a collision of autonomous vehicle 402 has occurred.

At block 607, in response to determining that event has occurred, a transfer of data is initiated. For example, processing device 209 can initiate a data transfer process based on determining that a collision has occurred. The data transfer process can be part of a hibernation is initiated based on determining that the collision has occurred and/or determining that power has been lost to one or more system components.

The data transfer is controlled by a second processing device. For example, controller 308 or DMA controller 412 can control the copying of data during the data transfer process. The transfer of data includes copying data stored in volatile memory of the autonomous vehicle or another system to non-volatile memory of the autonomous vehicle or other system. For example, data in memory region 201 of volatile memory 207 can be copied with higher priority to non-volatile memory 211. Then, lower priority memory region 203 can be copied. Processing device 209 and/or controller 308 can determine this priority based on the collected data received by processing device 209 and/or other data received by controller 308. The second processing device controls copying the data independently of the first processing device.

At block 609, in response to determining that the event has occurred, power is reduced to the first processing device. For example, power to processing device 209 from primary power source 312 can be shut off.

In one aspect, the present disclosure includes computing apparatuses performing any of the methods and non-transitory computer-readable storage media storing instructions that, when executed by a processing device, cause the processing device to perform any of the methods.

In one embodiment, a method comprises: collecting data associated with operation of an autonomous vehicle; monitoring, by a first processing device, the collected data; and based on the monitoring, determining that an event on the autonomous vehicle has occurred.

The method further comprises, in response to determining that the event has occurred: initiating a transfer of data controlled by a second processing device, the transfer including copying data stored in volatile memory of the autonomous vehicle to non-volatile memory of the autonomous vehicle, wherein the second processing device controls copying of the data independently of the first processing device; and reducing power to the first processing device.

In one embodiment, the event is a loss of power or an impending loss of power from a power source (e.g., primary power source 312) of the autonomous vehicle.

In one embodiment, the transfer of data is part of a hibernation process.

In one embodiment, the collected data includes data from at least one accelerometer of the autonomous vehicle, and the event is a deceleration of the vehicle that exceeds a predetermined threshold.

In one embodiment, the first processing device and the second processing device are powered by at least one first power source (e.g., power source 406) of the autonomous vehicle, and wherein reducing power to the first processing device comprises shutting down power provided from the at least one first power source to the first processing device.

In one embodiment, the method further comprises, in response to determining that the event has occurred, switching power to the second processing device so that the power is provided to the second processing device by a second power source (e.g., backup power source 426) instead of by the at least one first power source.

In one embodiment, the event is a collision of the vehicle with another object.

In one embodiment, the method further comprises sending, by the second processing device, a signal to the first processing device, the signal indicating that copying of the data has been completed.

In one embodiment, a system comprises: volatile memory (e.g., volatile memory 408); non-volatile memory (e.g., non-volatile memory 410); at least one processing device; and memory storing instructions configured to instruct the at least one processing device to: collect data from at least one computing system (e.g., computing system(s) 302); monitor, by a first processing device, the collected data, wherein the first processing device is powered by a first power source; and based on the monitoring, determine that an event associated with the at least one computing system has occurred.

The instructions are further configured to instruct the at least one processing device to, in response to determining that the event has occurred: initiate a transfer of data controlled by a second processing device, the transfer including copying data stored in the volatile memory to the non-volatile memory, wherein the second processing device controls copying of the data independently of the first processing device; after initiating the transfer of data, reduce or terminate power to the first processing device; and switch a source of power for the second processing device to a second power source.

In one embodiment, the collected data includes data indicating failure or impending failure of a power source that provides power to the volatile memory.

In one embodiment, the volatile memory comprises a plurality of memory regions, and the instructions are further configured to instruct the at least one processing device to determine an ordering (e.g., a priority ordering for copying)

of the memory regions (e.g., memory regions 201, 203, 205), wherein copying the data stored in the volatile memory comprises copying the memory regions to the non-volatile memory in the determined ordering.

In one embodiment, the determined ordering is based on monitoring the collected data.

In one embodiment, monitoring the collected data includes providing the collected data as an input to a machine learning model (e.g., machine learning model 215).

In one embodiment, monitoring the collected data includes determining a status of at least one power source that provides power to the first processing device or the volatile memory.

In one embodiment, monitoring the collected data includes determining failure or impending failure of the first power source, and wherein the second power source is a backup power source.

In one embodiment, the transfer of data is part of a hibernation process.

In one embodiment, the second processing device is configured to send a signal to the first processing device, the signal indicating that copying the data is completed.

In one embodiment, the collected data includes data from at least one accelerometer.

In one embodiment, a non-transitory computer-readable storage medium stores instructions that, when executed by at least one processing device, cause the at least one processing device to perform a method, the method comprising: collecting data from at least one computing system; monitoring, by a first processing device, the collected data; based on the monitoring, determining that an event has occurred; and in response to determining that the event has occurred, initiating a transfer of data controlled by a second processing device, the transfer including copying data stored in volatile memory to non-volatile memory.

In one embodiment, the first processing device and the second processing device are each powered by at least one first power source, and the method further comprises, in response to determining that the event has occurred, switching power to the second processing device so that the power is provided to the second processing device by a second power source instead of by the at least one first power source.

In one embodiment, the data transfer process is initiated in response to detection of an impending power loss to the volatile memory.

In one example, when a computer is placed in a hibernation mode, the computer may turn off the power to DRAM to save power, and/or cut the power to the CPU to avoid running out of battery power and failing to come back on when trying to restore the system.

In one embodiment, some RAM contents can be regenerated (and thus do not need to be saved during hibernation) when the operating system and applications are loaded back to the memory and again running. The software of the operating system and/or the applications in the memory may also have a copy of corresponding data (e.g., application code) in the hard drive already. Thus, indications of which portions of the stored software on the hard drive corresponding to which code segment in the memory can be stored to avoid storing the software (e.g. these indications also can be stored in a memory map).

Some run-time data (e.g., data in memory dynamically allocated for an application or program) are critical. If such data is corrupted, the application/program may not be able to recover (i.e., may have to be restarted). This data can be identified as critical in a memory map or by other means to have a higher priority order for copying.

In some other instances, restarting such application of program may not be of concern. Thus, these applications/programs can be identified as non-critical and not backed up (e.g., in a SSD). However, other data (e.g., critical or another identified type of data) can be copied to the SSD (e.g., with a lower order priority).

Figure 7:
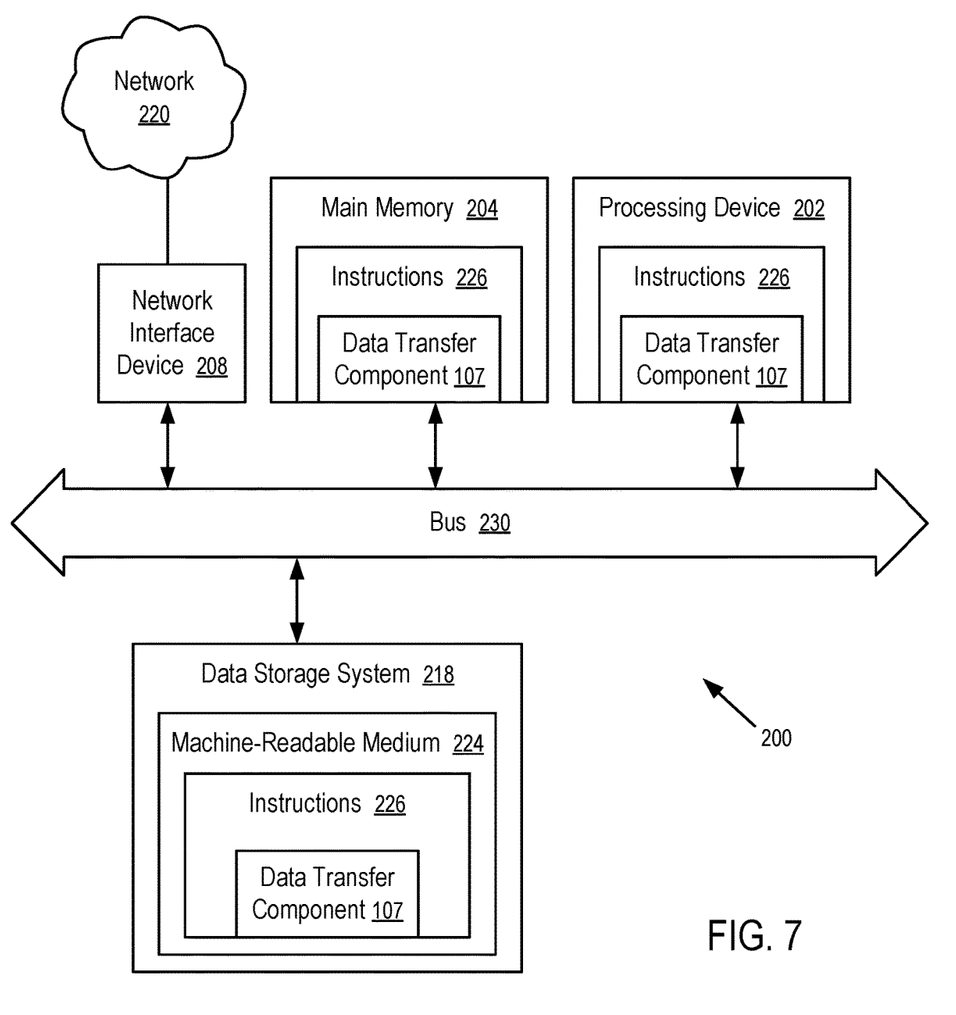
FIG. 7 is a block diagram of an example computer system in which embodiments of the present disclosure can operate.

FIG. 7 is a block diagram of an example computer system 200 in which embodiments of the present disclosure can operate. In one embodiment, in computer system 200 a set of instructions, for causing a machine to perform any one or more of the methodologies discussed herein, can be executed. In some embodiments, the computer system 200 can correspond to a memory system, or to a host system that includes, is coupled to, or utilizes a memory system (e.g., the memory system 105 of FIG. 1) or can be used to perform the operations of a data transfer component 107 (e.g., to execute instructions to perform operations corresponding to the data transfer component 107 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory system 105 of FIG. 1.

In one embodiment, the instructions 226 include instructions to implement functionality corresponding to a data transfer component 107 (e.g., the data transfer component 107 described with reference to FIGS. 1-6). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
   a processing device; and
   memory storing instructions configured to instruct the processing device to:
   monitor collected data associated with at least one computing apparatus;
   determine, based on monitoring of the collected data, that an event associated with the at least one computing apparatus has occurred; and
   in response to determining that the event has occurred:
   initiate copying stored data from a volatile memory of the system to a non-volatile memory of the system, wherein the copying of the stored data from the volatile memory to the non-volatile memory is conducted in accordance with a priority for each respective memory region in the volatile memory,
   wherein the processing device is further configured to determine the priority for the respective memory region based on the collected data associated with the at least one computing apparatus, and a determination of a manner in which the respective memory region is used by a software process, and
   wherein the processing device is further configured to order the respective memory region based on a context of memory allocation request received by the software process.

2. The system of claim 1, further comprising a different processing device, wherein the different processing device is configured to control the copying of the stored data from the volatile memory to the non-volatile memory.

3. The system of claim 1, wherein the processing device is further configured to reduce power to the processing device upon initiation of the copying of the stored data.

4. The system of claim 1, wherein the event comprises a loss of power or an impending loss of power from a power source associated with the system.

5. The system of claim 1, wherein the event is a change in acceleration that exceeds a predetermined threshold.

6. The system of claim 1, wherein the processing device is further configured to switch power to a different processing device so that the different processing device is powered by a backup power source.

7. The system of claim 1, wherein the processing device is further configured to copy a first portion of the stored data from a first memory region in the volatile memory to the non-volatile memory prior to a second portion of the stored data from a second memory region in the volatile memory based on first memory region having a higher priority than the second memory region.

8. The system of claim 1, wherein the processing device is further configured to apply, by utilizing a firmware module, the collected data to an artificial neural network defined by a model to generate an output to facilitate determining that the event has occurred.

9. The system of claim 8, wherein the processing device is further configured to update the firmware module via an over-the-air update sent in response to the event occurring.

10. The system of claim 1, wherein the processing device is further configured to activate a vehicle control in response to determining that the event has occurred.

11. A method comprising:
monitoring, by utilizing a processing device of a system, collected data associated with at least one computing apparatus;
determining, based on the monitoring, that an event associated with the at least one computing apparatus has occurred; and
in response to determining that the event has occurred:
initiating, by utilizing the processing device, copying stored data from a volatile memory of the system to a non-volatile memory of the system, wherein the copying of the stored data from the volatile memory to the non-volatile memory is conducted in accordance with a priority for each respective memory region in the volatile memory,
wherein determining the priority for the respective memory region is based on the collected data associated with the at least one computing apparatus, and a determination of a manner in which the respective memory region is used by a software process, and
wherein the method further includes ordering, by the processing device, the respective memory region based on a context of memory allocation request received by the software process.

12. The method of claim 11, further comprising controlling the copying of the stored data from the volatile memory to the non-volatile memory by utilizing a different processing device of the system.

13. The method of claim 11, further comprising terminating power to the processing device after determining that the event has occurred.

14. The method of claim 11, further comprising converting a command received from a host system into a command instruction to access at least one memory region in the volatile memory.

15. The method of claim 11, further comprising training an artificial neural network based on information associated with the event.

16. The method of claim 11, further comprising allocating power to components of the system based on the collected data.

17. A data storage device comprising:
a processing device configured to:
analyze collected data associated with at least one computing apparatus;
determine, based on analyzing of the collected data, that an event associated with the at least one computing apparatus has occurred; and
in response to determining that the event has occurred:
initiate copying data stored in a volatile memory of a system to a non-volatile memory of the system in accordance with a priority for each respective memory region in the volatile memory,
wherein determining the priority for the respective memory region is based on the collected data associated with the at least one computing apparatus, and a determination of a manner in which the respective memory region is used by a software process, and
wherein the processing device is further configured to order the respective memory region based on a context of memory allocation request received by the software process.

* * * * *